US011482953B2

(12) United States Patent
Chen et al.

(10) Patent No.: US 11,482,953 B2
(45) Date of Patent: Oct. 25, 2022

(54) ELECTRIC ACTUATOR DEVICE AND CONTROL METHOD THEREOF

(71) Applicant: ACTRON TECHNOLOGY CORPORATION, Taoyuan (TW)

(72) Inventors: Wei-Jing Chen, Taoyuan (TW); Shang-Shu Chung, Taoyuan (TW); Shih-Chieh Hou, Taoyuan (TW); Huei-Chi Wang, Taoyuan (TW)

(73) Assignee: ACTRON TECHNOLOGY CORPORATION, Taoyuan (TW)

( * ) Notice: Subject to any disclaimer, the term of this patent is extended or adjusted under 35 U.S.C. 154(b) by 0 days.

(21) Appl. No.: 17/214,955

(22) Filed: Mar. 29, 2021

(65) Prior Publication Data

US 2022/0224262 A1    Jul. 14, 2022

(30) Foreign Application Priority Data

Jan. 8, 2021   (TW) .................................. 110100823

(51) Int. Cl.
*H02P 6/24* (2006.01)
*H02P 6/06* (2006.01)

(52) U.S. Cl.
CPC . *H02P 6/24* (2013.01); *H02P 6/06* (2013.01)

(58) Field of Classification Search
CPC .... H02P 6/06; H02P 6/24; H02P 27/06; H02P 3/18; H02P 27/04; H02P 1/026
See application file for complete search history.

(56) References Cited

U.S. PATENT DOCUMENTS

| | | | |
|---|---|---|---|
| 7,151,406 B2* | 12/2006 | Labbe ..................... | H03F 3/217 330/10 |
| 8,289,010 B1* | 10/2012 | Fernald ................. | H02M 3/156 323/283 |
| 10,270,364 B2* | 4/2019 | Degner .................. | H02M 1/38 |

(Continued)

FOREIGN PATENT DOCUMENTS

| | | |
|---|---|---|
| CN | 106870426 | 6/2017 |
| JP | 2011205848 | 10/2011 |
| TW | I673045 | 10/2019 |

OTHER PUBLICATIONS

"Office Action of Taiwan Counterpart Application", dated Sep. 2, 2021, p. 1-p. 8.

*Primary Examiner* — Thai T Dinh
(74) *Attorney, Agent, or Firm* — JCIPRNET (57) ABSTRACT

An electronic actuator device and a control method thereof are provided. The electronic actuator device includes a plurality of first and second power switches and a driving circuit. The first power switches respectively provide a first reference voltage to a plurality of voltage receiving ends of a motor respectively according to a plurality of first control signals. The second power switches respectively provide a second reference voltage to the voltage receiving ends respectively according to a plurality of second control signals. The driving circuit generates the first and second control signals. In a braking operation, the first power switches are turned on during a plurality of first time periods, and the second switches are turned on during a plurality of second time periods that are alternate and non-overlapped with the first time periods. An interval time period is present between each adjacent two of the first and second time periods.

12 Claims, 5 Drawing Sheets

(56) References Cited

U.S. PATENT DOCUMENTS

| | | | | |
|---|---|---|---|---|
| 2004/0081438 A1* | 4/2004 | Hahn | ............... | H02P 6/28 |
| | | | | 388/804 |
| 2005/0174076 A1* | 8/2005 | Katanaya | ............ | H02P 29/0241 |
| | | | | 318/400.28 |
| 2009/0256509 A1* | 10/2009 | Hiramine | ............... | H02P 21/34 |
| | | | | 318/400.13 |
| 2009/0278621 A1* | 11/2009 | Kris | ............... | H03K 7/08 |
| | | | | 332/109 |
| 2013/0093377 A1* | 4/2013 | Minami | ............... | H03K 7/08 |
| | | | | 327/172 |
| 2016/0211772 A1* | 7/2016 | Degner | ............... | H02M 1/38 |
| 2020/0130127 A1* | 4/2020 | Yoshinari | ............... | H02P 6/24 |

\* cited by examiner

ELECTRIC ACTUATOR DEVICE AND CONTROL METHOD THEREOF

CROSS-REFERENCE TO RELATED APPLICATION

This application claims the priority benefit of Taiwanese application no. 110100823, filed on Jan. 8, 2021. The entirety of the above-mentioned patent application is hereby incorporated by reference herein and made a part of this specification.

BACKGROUND

Technical Field

The disclosure relates to an electric actuator device and a control method thereof; in particular, the disclosure relates to an electric actuator device and a control method thereof that reduce damage to elements.

Description of Related Art

When an electric actuator device performs a braking operation, a plurality of voltage receiving ends of the motor are caused to receive the same voltage. Conventionally, in the braking operation of the electric actuator device, power switches at all upper arms or all lower arms are turned on to perform the braking operation. In this way, the kinetic energy that needs to be consumed in the braking operation will be dissipated on the power switches in the form of heat energy. Therefore, in the conventional way, since the heat energy generated in the braking operation of the electric actuator device is concentrated on specific power switches for a long time, damage is caused to the power switches and the life and reliability of the electric actuator device are reduced.

SUMMARY

The disclosure provides an electric actuator device and a control method thereof that increase reliability of a power switch.

According to an embodiment of the disclosure, an electric actuator device includes a plurality of first power switches, a plurality of second power switches, and a driving circuit. The first power switches respectively provide a first reference voltage to a plurality of voltage receiving ends of a motor respectively according to a plurality of first control signals. The second power switches respectively provide a second reference voltage to the voltage receiving ends respectively according to a plurality of second control signals. The driving circuit is coupled to the first power switches and the second power switches to generate the first control signals and the second control signals. In a braking operation, the first power switches are simultaneously turned on during a plurality of first time periods, and the second switches are simultaneously turned on during a plurality of second time periods. The first time periods and the second time periods are alternate and non-overlapped with each other, and an interval time period is present between each adjacent two of the first time periods and the second time periods.

According to an embodiment of the disclosure, a control method of an electric actuator device includes the following. A plurality of first power switches are provided to respectively provide a first reference voltage to a plurality of voltage receiving ends of a motor respectively according to a plurality of first control signals. A plurality of second power switches are provided to respectively provide a second reference voltage to the voltage receiving ends of the motor respectively according to a plurality of second control signals. In addition, in a braking operation, the first power switches are simultaneously turned on during a plurality of first time periods, and the second power switches are simultaneously turned on during a plurality of second time periods. The first time periods and the second time periods are alternate and non-overlapped with each other, and an interval time period is present between each adjacent two of the first time periods and the second time periods.

Based on the foregoing, when the electric actuator device performs the braking operation, the plurality of first power switches disposed at the upper arm positions and the plurality of second power switches disposed at the lower arm positions are turned on alternately by time-division. In this way, excessive damage to any power switch due to long-term use can be reduced, and the service life of the electric actuator device can be increased.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
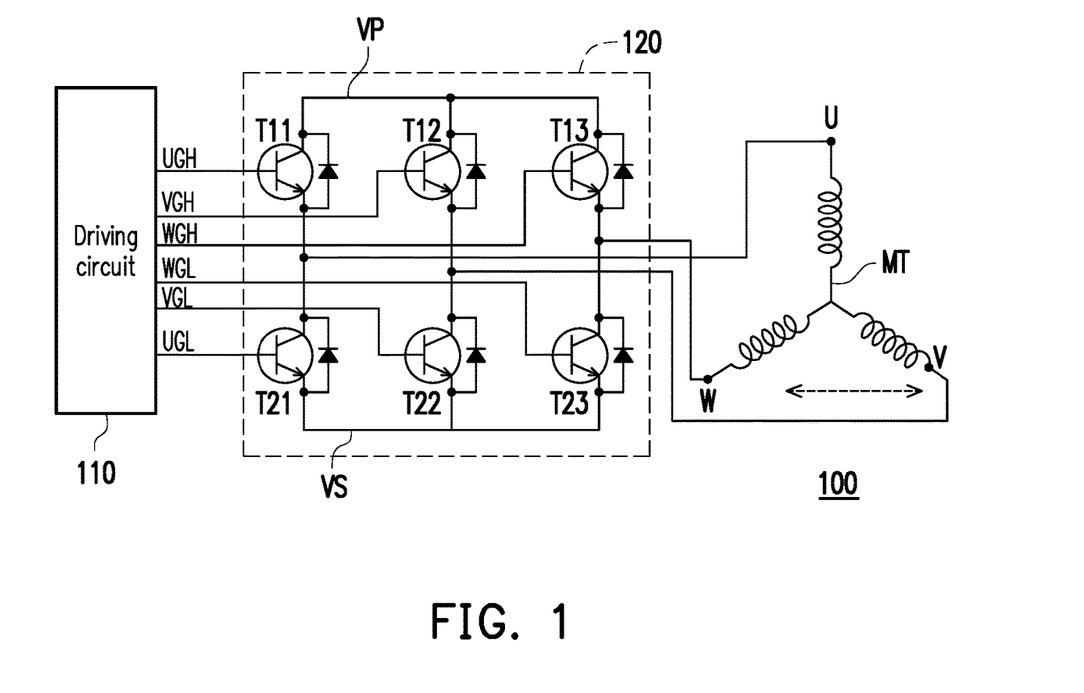
FIG. 1 is a schematic diagram showing an electric actuator device according to an embodiment of the disclosure.

With reference to FIG. 1, which is a schematic diagram showing an electric actuator device according to an embodiment of the disclosure, an electric actuator device 100 includes a driving circuit 110, a supply source switcher 120, and a motor MT. The supply source switcher 120 includes a plurality of first power switches T11 to T13 disposed at upper arm positions and a plurality of second power switches T21 to T23 disposed at lower arm positions. The first power switches T11 to T13 and the second power switches T21 to T23 are respectively formed of a plurality of power transistors. To be specific, the first power switch T11 and the second power switch T21 are sequentially connected in series between a first reference voltage VP and a second reference voltage VS, and a terminal where the first power switch T11 and the second power switch T21 are coupled to each other is also coupled to a voltage receiving end U of the motor MT. The first power switch T12 and the second power switch T22 are sequentially connected in series between the first reference voltage VP and the second reference voltage VS, and a terminal where the first power switch T12 and the second power switch T22 are coupled to each other is also coupled to a voltage receiving end V of the motor MT. In addition, the first power switch T13 and the second power switch T23 are sequentially connected in series between the first reference voltage VP and the second reference voltage VS, and a terminal where the first power switch T13 and the second power switch T23 are coupled to each other is also coupled to a voltage receiving end W of the motor MT.

On the other hand, the driving circuit 110 is configured to generate a plurality of first control signals UGH, VGH, WGH, and a plurality of second control signals UGL, VGL, and WGL. The first control signals UGH, VGH, WGH respectively control the first power switches T11, T12, and T13 to be turned on or off, and the second control signals UGL, VGL, WGL respectively control the second power switches T21, T22, and T23 to be turned on or off.

When the first power switch T11 is turned on, the first reference voltage VP may be transmitted through the first power switch T11 to the voltage receiving end U of the motor MT. Similarly, through respectively turning on the first power switches T12 and T13, the first reference voltage VP may be transmitted to the voltage receiving ends V and W of the motor MT. On the other hand, when the second power switch T21 is turned on, the second reference voltage VS may be transmitted through the second power switch T21 to the voltage receiving end U of the motor MT. Similarly, through respectively turning on the second power switches T22 and T23, the second reference voltage VS may be transmitted to the voltage receiving ends V and W of the motor MT. In this embodiment, the first reference voltage VP is greater than the second reference voltage VS. In addition, the first power switch T11 and the second power switch T21 are not simultaneously turned on, the first power switch T12 and the second power switch T22 are not simultaneously turned on, and the first power switch T13 and the second power switch T23 are not simultaneously turned on.

When the electric actuator device 100 is operating normally, the driving circuit 110 may provide the first control signals UGH, VGH, WGH with a set phase difference and the second control signals UGL, VGL, WGL with the same set phase difference to drive the motor MT through the supply source switcher 120. The set phase difference, for example, may be 120 degrees. Besides, the driving circuit 110 may control the operating speed of the motor MT through controlling a frequency of the first control signals UGH, VGH, WGH and the second control signals UGL, VGL, WGL.

In this embodiment, the motor MT may be a brushless DC motor.

In this embodiment, when the electric actuator device 100 is to perform a braking operation on the motor MT, the driving circuit 110 may simultaneously turn on the first power switches T11 to T13 during a plurality of first time periods, and simultaneously turn on the second power switches T21 to T23 during a plurality of second time periods. The first time periods and the second time periods are alternate and non-overlapped each other, and an interval time period is present between each adjacent two of the first time periods and the second time periods.

Figure 2:
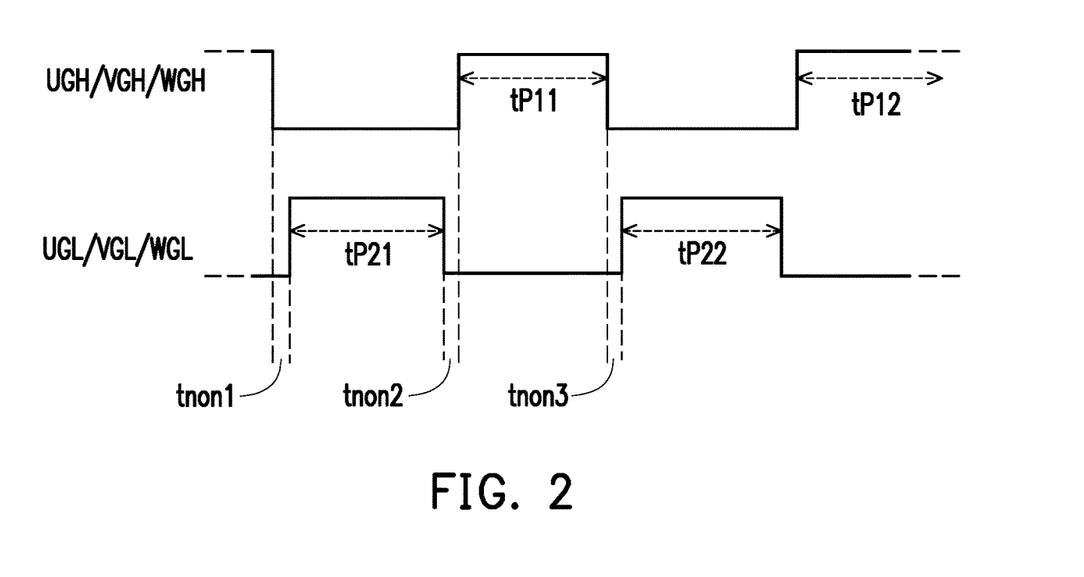
FIG. 2 is a schematic diagram showing waveforms of the control signals of the braking operation of the electric actuator device according to the embodiment of the disclosure.

Herein, reference may be to FIG. 1 and FIG. 2 together, where FIG. 2 is a schematic diagram showing waveforms of the control signals of the braking operation of the electric actuator device according to the embodiment of the disclosure. In FIG. 2, in the braking operation, the driving circuit 110 generates the first control signals UGH, VGH, and WGH with a same waveform, and generates the second control signals UGL, VGL, and WGL with a same waveform. The first control signals UGH, VGH, and WGH are enabled during the plurality of first time periods tP11 to tP12 (pulled up to a high voltage level), and simultaneously turn on the first power switches T11 to T13 during the first time periods tP11 to tP12. The second control signals UGL, VGL, and WGL are enabled (pulled to a high voltage level) during the plurality of second time periods tP21 to tP22, and simultaneously turn on the second power switches T21 to T23 during the second time periods tP21 to tP22. In addition, when the first power switches T11 to T13 are turned on, the second power switches T21 to T23 are all turned off. Similarly, when the second power switches T21 to T23 are turned on, the first power switches T11 to T13 are all turned off.

Besides, in this embodiment, interval time periods tnon1 to tnon3 may be present between each adjacent two of the first time periods and the second time periods. For example, the interval time period tnon2 may be present between the first time period tP11 and the second time period tP21.

To further explain, during the second time period tP21, when the second power switches T21 to T23 are simultaneously turned on, the voltage receiving ends U, V, and W of the motor MT each receive the same second reference voltage VS, such that the motor MT may perform the braking operation. During the first time period tP11 after the interval time period tnon2, when the first power switches T11 to T13 are simultaneously turned on, the voltage receiving ends U, V, and W of the motor MT each receive the same first reference voltage VP, and the motor MT may continue to perform the braking operation.

In this embodiment, the braking operation of the motor MT may be performed through alternately turning on or off the first power switches T11 to T13 and the second power switches T21 to T23, which spreads heat energy generated when the first power switches T11 to T13 and the second power switches T21 to T23 are turned on, and extends their service lives.

Notably, in the embodiment of the disclosure, the first time periods tP11 to tP12 and the second time periods tP21 to tP22 may each have a same or different duration, which is not particularly limited. In addition, the first time periods tP11 to tP12 may also each have a same or different duration, and the second time periods tP21 to tP22 may also each have a same or different duration, which is not particularly limited.

Besides, the driving circuit 110 may control the durations of the first time periods tP11 to tP12, the second time periods tP21 to tP22, and the interval time periods tnon1 to tnon3 according to a rotation speed of the motor MT before the braking operation. The driving circuit 110 may detect the rotation speed of the motor MT before the braking operation to obtain rotation speed information, and determine expected durations of the first time periods tP11 to tP12, the second time periods tP21 to tP22, and the interval time periods tnon1 to tnon3 according to the rotation speed information. In addition, the driving circuit 110 may generate the first control signals UGH, VGH, WGH and the second control signals UGL, VGL, WGL, according to the expected durations of the first time periods tP11 to tP12, the second time periods tP21 to tP22, and the interval time periods tnon1 to tnon3, and control the durations of the first time periods tP11 to tP12 and the second time periods tP21 to tP22, and durations of the interval time periods tnon1 to tnon3 through the first control signals UGH, VGH, WGH and the second control signals UGL, VGL, WGL.

In an embodiment of the disclosure, in the braking operation of the driving circuit 110, a total duration of the first time period tP11, the second time period tP21, and the interval time period tnon2 may be negatively correlated with the rotation speed information of the motor MT before the braking operation.

Incidentally, the duration of the interval time periods tnon1 to tnon3 may be set according to a speed at which the first power switches T11 to T13 and the second power switches T21 to T23 are turned on and off. The point is that the turning on of the first power switches T11 to T13 requires to be performed after the second power switches T21 to T23 are completely turned off, and the turning on of the second power switches T21 to T23 requires to be performed after the first power switches T11 to T13 are completely turned off, to prevent a leakage path from being generated due to any one of the first power switches T11 to T13 being simultaneously turned on with any one of the second power switches T21 to T23 correspondingly connected in series.

Figure 3:
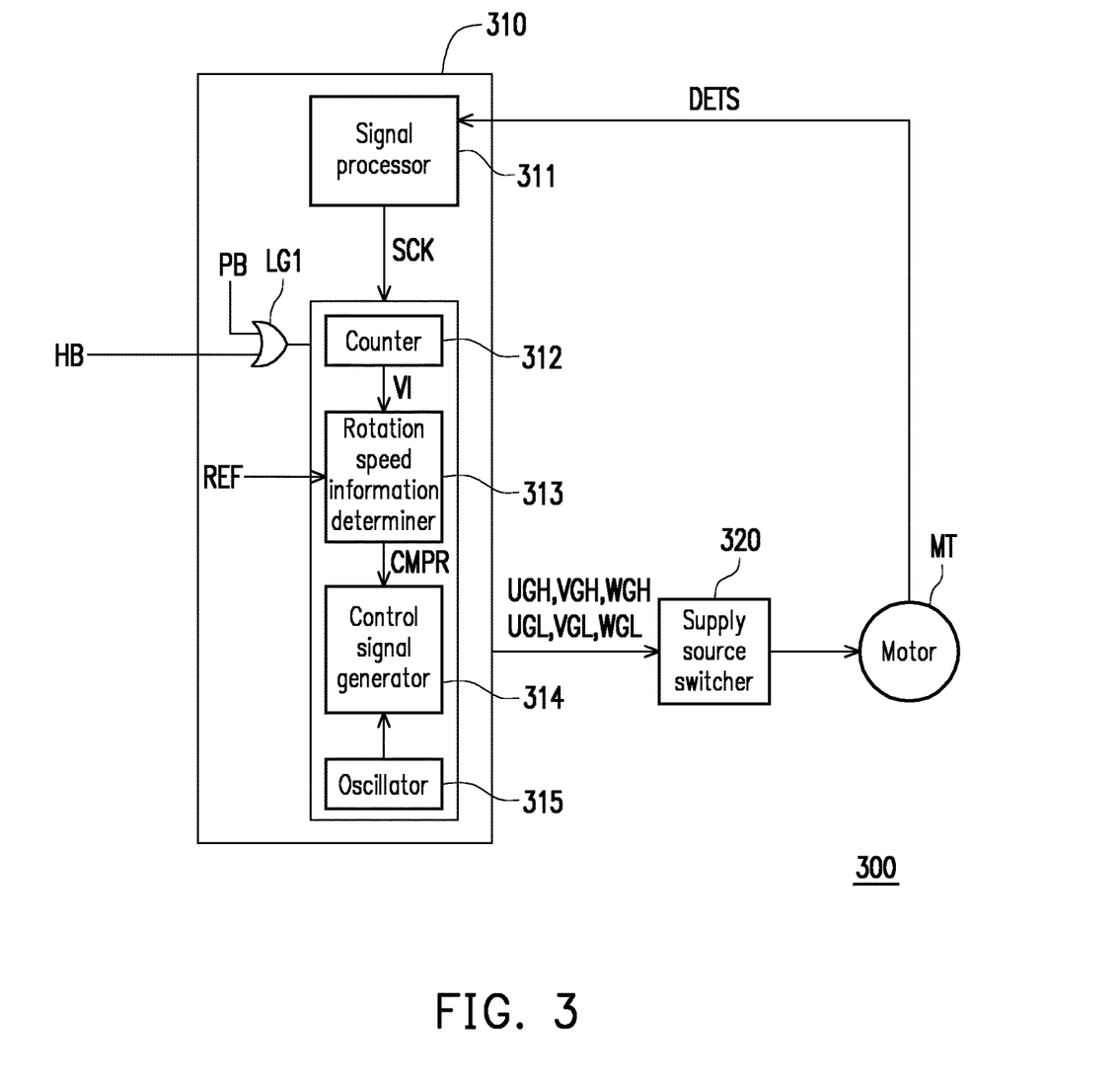
FIG. 3 is a schematic diagram showing an electric actuator device according to another embodiment of the disclosure.

Hereinafter, reference may be made to FIG. 3, which is a schematic diagram showing an electric actuator device according to another embodiment of the disclosure. An electric actuator device 300 includes a driving circuit 310, a supply source switcher 320, and the motor MT. The driving circuit 310 includes a signal processor 311, a counter 312, a rotation speed information determiner 313, a control signal generator 314, and an oscillator 315. The electric actuator device 300 may detect a rotation speed of a rotor of the motor MT and generate a detection signal DETS. The signal processor 311 may receive the detection signal DETS and process the detection signal DETS to generate a clock signal SCK, where a frequency of the clock signal SCK may correspond to the rotation speed of the rotor of the motor MT.

Besides, the counter 312 counts according to the clock signal SCK, and generates rotation speed information VI. The rotation speed information VI may be provided to the rotation speed information determiner 313, and the rotation speed information determiner 313 may compare the rotation speed information VI with a reference value REF to generate a comparison result CMPR. In this embodiment, the reference value REF may include one or more reference values. The reference value REF is configured to distinguish the rotation speed information VI into a plurality of intervals, and the rotation speed information determiner 313 determines a rotation speed state of the motor MT before braking through comparing the reference value REF with the rotation speed information VI.

To further explain, where the number of the reference value REF is one, when the rotation speed information VI is greater than the reference value REF, the rotation speed information determiner 313 may determine that the rotation speed of the motor MT before braking is in a high rotation speed state, and notify the control signal generator 314 of the determination result through the comparison result CMPR. On the other hand, when the rotation speed information VI is not greater than the reference value REF, the rotation speed information determiner 313 may determine that the rotation speed of the motor MT before braking is in a low rotation speed state, and notify the control signal generator 314 of the determination result through the comparison result CMPR.

Where the number of the reference value REF is two, the reference value REF may include a first reference value that is relatively large and a second reference value that is relatively small. When the rotation speed information VI is greater than the first reference value, the rotation speed information determiner 313 may determine that the rotation speed of the motor MT before braking is in the high rotation speed state. When the rotation speed information VI is between the first reference value and the second reference value, the rotation speed information determiner 313 may determine that the rotation speed of the motor MT before braking is in an intermediate rotation speed state. When the rotation speed information VI is less than the second reference value, the rotation speed information determiner 313 may determine that the rotation speed of the motor MT before braking is in the low rotation speed state.

The control signal generator 314 may generate the first control signals UGH, VGH, WGH and the second control signals UGL, VGL, WGL according to the rotation speed state corresponding to the comparison result CMPR. According to the different rotation speed states, the control signal generator 314 may adjust a duration where the first control signals UGH, VGH, WGH and the second control signals UGL, VGL, WGL are enabled so as to optimize the braking operation of the motor MT.

On the other hand, the oscillator 315 is coupled to the control signal generator 314 and is configured to provide an oscillation clock required in the operation of the control signal generator 314.

Besides, the driving circuit 310 also includes a logic gate LG1. The logic gate LG1 receives a protection brake activating signal PB and a hardware brake activating signal HB. The logic gate LG1 performs an OR operation on the protection brake activating signal PB and the hardware brake activating signal HB, such that the counter 312 may determine whether to start counting according to the operation result of the logic gate LG1. In this embodiment, the protection brake activating signal PB is an internally generated signal of the driving circuit 310, and the hardware brake activating signal HB may be an external signal. The protection brake activating signal PB and the hardware brake activating signal HB may each be configured to start the braking operation of the electric actuator device 300.

With respect to the hardware architecture, the driving circuit 310 may be constructed with a digital circuit. The signal processor 311 may be implemented applying a digital signal processor (DSP). The counter 312 may be a digital counter in any form. The rotation speed information determiner 313 may be a digital comparison circuit. The control signal generator 314 may be formed with a combination logic circuit and a timing control circuit (e.g., constructed with a plurality of flip-flops). The oscillator 315 may be implemented applying an oscillator circuit in any form known to those with common knowledge in the related field.

Besides, the supply source switcher 320 may be the supply source switcher 120 as shown in FIG. 1. The motor MT may be a brushless DC motor.

Figure 4A:
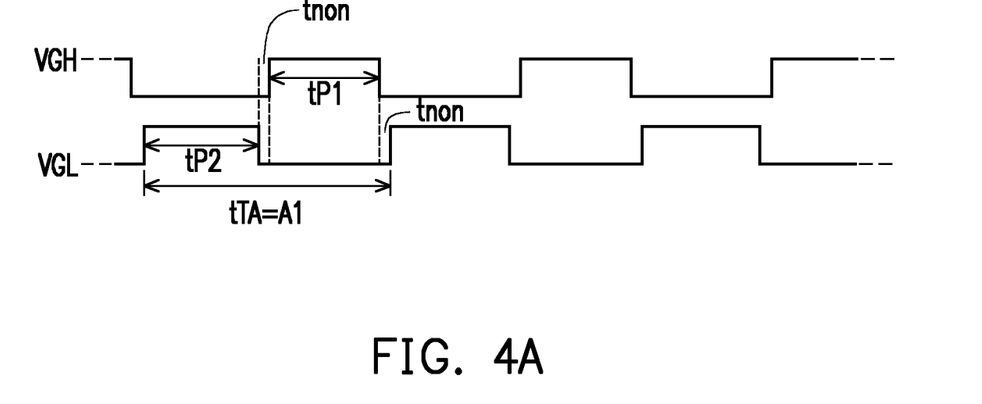
FIG. 4A and FIG. 4B are schematic diagrams showing waveforms of the control signals according to the embodiment of the disclosure.
Figure 4B:
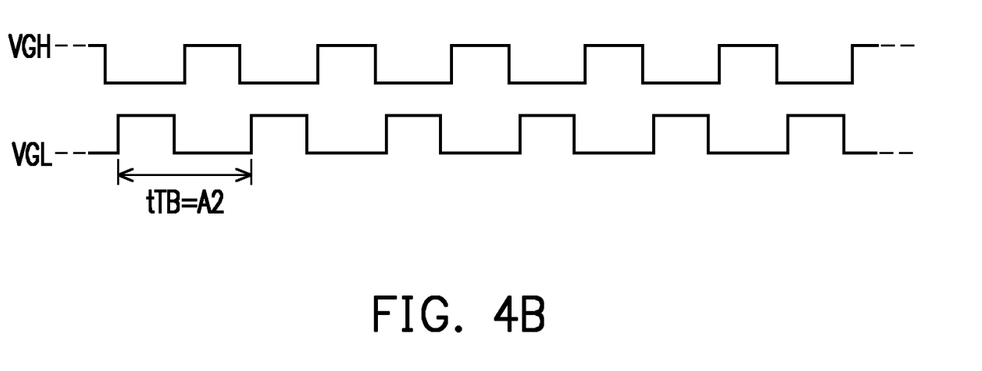
Figure 5A:
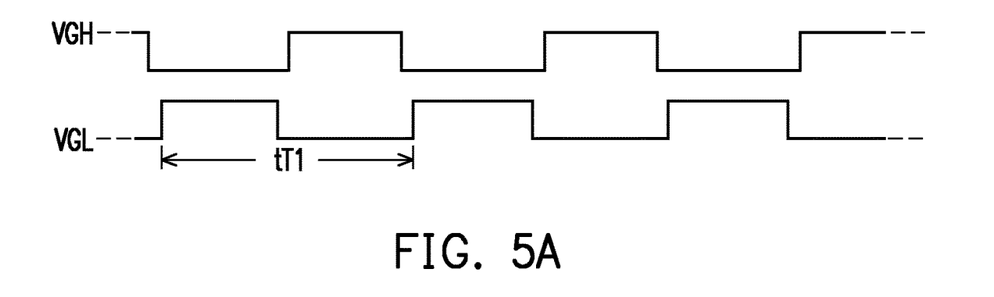
FIG. 5A to FIG. 5D are schematic diagrams showing waveforms of control signals according to another embodiment of the disclosure.
Figure 5B:
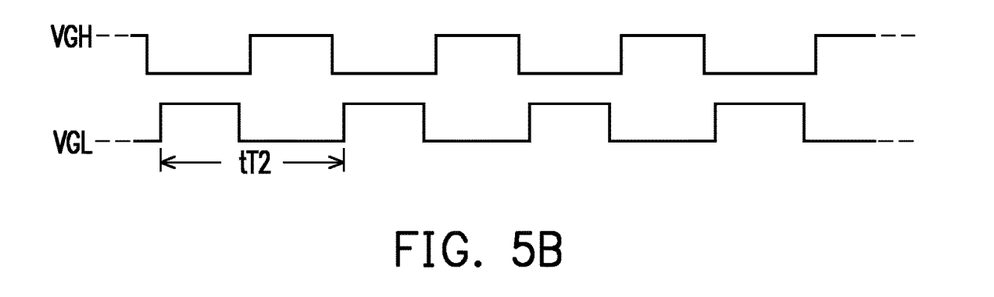
Figure 5C:
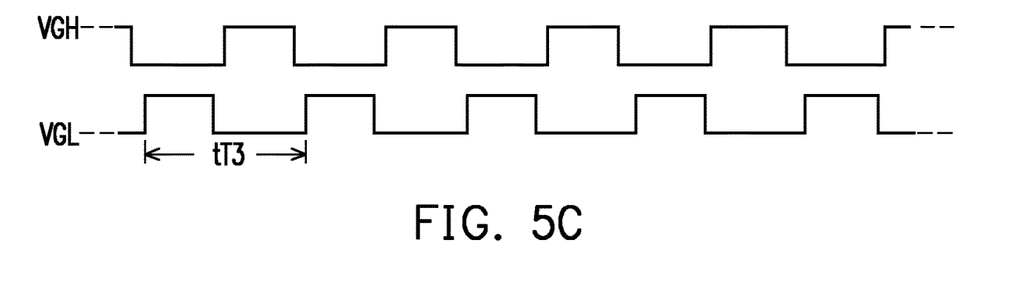
Figure 5D:
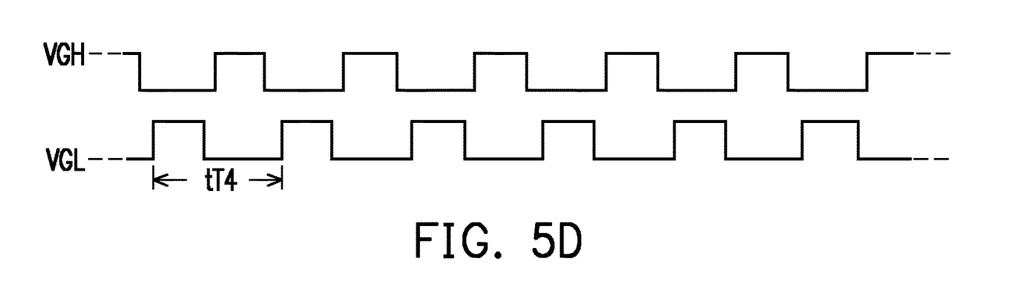

Hereinafter, reference may be made to FIG. 4A and FIG. 4B, which are schematic diagrams showing waveforms of the control signals according to the embodiment of the disclosure. In FIG. 4A, the driving circuit may determine whether the rotation speed of the motor before the braking operation is in the high rotation speed state or the low rotation speed state according to a reference signal with a number of 1. In the low rotation speed state, the driving circuit may set a total time period tTA (total duration) of a first time period tP1 of the generated first control signal UGH, a second time period tP2 of the generated second control signal UGL, and two interval time periods tnon to a first value A1. In FIG. 4B, according to the reference signal, the driving circuit may determine a total time period tTB (total duration) of the first time period tP1 of the first control signal UGH, the second time period tP2 of the second control signal UGL, and two interval time periods tnon to be a second value A2. The first value A1 is greater than the second value A2.

In other embodiments of the disclosure, it is also possible that the first value A1 is generated through adding the first time period tP1 of the first control signal UGH, the second time period tP2 of the second control signal UGL, and one interval time period tnon, and the second value A2 is generated through adding the first time period tP1 of the first control signal UGH, the second time period tP2 of the second control signal UGL, and one interval time period tnon.

Hereinafter, reference may be made to FIG. 5A to FIG. 5D, which are schematic diagrams showing waveforms of control signals according to another embodiment of the disclosure. In FIG. 5A to FIG. 5D, a driving circuit may determine a rotation speed state of a motor before a braking operation according to reference signals with a number of 3. FIG. 5A to FIG. 5D are respectively of a first rotation speed, a second rotation speed, a third rotation speed, and a fourth rotation speed of the motor before the braking operation, where the first rotation speed<the second rotation speed<the third rotation speed<the fourth rotation speed. According to different rotation speed states of the motor, the driving circuit may control a total time period of a first time period of the first control signal VGH, a second time period of the second control signal VGL, and two interval time periods to be respectively durations tT1, tT2, tT3, and tT4, where tT1>tT2>tT3>tT4.

In the embodiments of FIG. 4A, 4B and FIG. 5A to FIG. 5B, only one group of control signals among the plurality of groups of control signals is drawn. Waveforms of the plurality of first control signals not shown may be the same as the first control signal VGH, and waveforms of the plurality of second control signals not shown may be the same as the second control signal VGL, which will not be repeatedly described herein.

In an embodiment of the disclosure, a frequency of the power switches being turned on and off may be adjusted according to the rotation speed state of the motor before the braking operation. Herein, it is notable that the heat energy that may be generated when the power switches are turned on to perform the braking operation is higher in the high rotation speed state than in the low rotation speed state. Based on this, through adjusting the duration where the power switches are turned on according to the rotation speed state of the motor, the heat energy generated when the power switches are turned on can thus be further decreased, and possible damage can be reduced.

Figure 6:
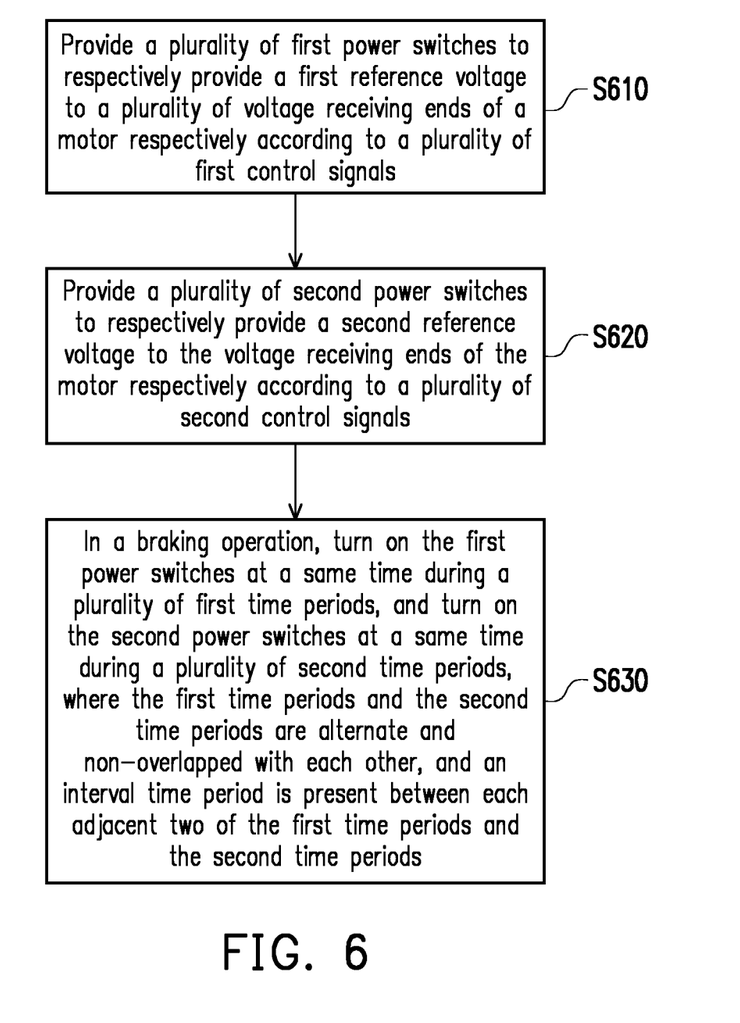
FIG. 6 is a flowchart showing a control method of an electric actuator device according to an embodiment of the disclosure.

With reference to FIG. 6, which is a flowchart showing a control method of an electric actuator device according to an embodiment of the disclosure. In FIG. 6, in step S610, a plurality of first power switches are provided to respectively provide a first reference voltage to a plurality of voltage receiving ends of a motor respectively according to a plurality of first control signals. In addition, in step S620, a plurality of second power switches are provided to respectively provide a second reference voltage to the voltage receiving ends of the motor respectively according to a plurality of second control signals. In step S630, in a braking operation, the first power switches are simultaneously turned on during a plurality of first time periods, and the second power switches are simultaneously turned on during a plurality of second time periods. The first time periods and the second time periods are alternate and non-overlapped with each other, and an interval time period is present between each adjacent two of the first time periods and the second time periods.

Implementation details of the above-mentioned steps have been described in detail in the foregoing embodiments, and will not be repeatedly described herein.

In summary of the foregoing, in the embodiment of the disclosure, in the braking operation of the electric actuator device, the power switches disposed at the upper arm positions and the power switches disposed at the lower arm positions are alternately turned on and off. In this way, the heat energy generated in the braking operation can be spread to the plurality of power switches by time-division, effectively reducing damage that may be caused to the power switches, and increasing the life and working efficiency of the electric actuator device.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electric actuator device, comprising:
   a plurality of first power switches respectively providing a first reference voltage to a plurality of voltage receiving ends of a motor respectively according to a plurality of first control signals;
   a plurality of second power switches respectively providing a second reference voltage to the voltage receiving ends of the motor respectively according to a plurality of second control signals; and
   a driving circuit coupled to the first power switches and the second power switches and being configured to generate the first control signals and the second control signals,
   wherein, in a braking operation, the first power switches are simultaneously turned during a plurality of first time periods, the second power switches are simultaneously turned on during a plurality of second time periods, the first time periods and the second time periods are alternate and non-overlapped with each other, and an interval time period is present between each adjacent two of the first time periods and the second time periods.

2. The electric actuator device according to claim 1, wherein, in the braking operation, when the first power switches are turned on, the second power switches are turned off; and when the second power switches are turned on, the first power switches are turned off.

3. The electric actuator device according to claim 1, wherein the first time period and the second time period each have an equal or unequal duration, the first time periods each have an equal or unequal duration, the second time periods each have an equal or unequal duration, and the interval time periods each have an equal or unequal duration.

4. The electric actuator device according to claim 1, wherein each of the first time periods, each of the second time periods, and at least one corresponding interval time period are summed for a total duration, and in the braking operation, the driving circuit controls the total duration according to rotation speed information of the motor.

5. The electric actuator device according to claim 4, wherein, in the total duration, the interval time period comprises two consecutive interval time periods, and one of the two consecutive interval time periods is the interval time period between the first time period and the second time period.

6. The electric actuator device according to claim 4, wherein the total duration is negatively correlated with the rotation speed information of the motor.

7. The electric actuator device according to claim 4, wherein the driving circuit compares the rotation speed information of the motor with at least one reference value that is predetermined, and adjusts the total duration according to a comparison result.

8. The electric actuator device according to claim 7, wherein the driving circuit comprises:
 a signal processor receiving a detection signal to generate a clock signal;
 a counter counting the clock signal to generate the rotation speed information;
 a rotation speed information determiner comparing the rotation speed information with the at least one reference value to generate the comparison result; and
 a control signal generator generating the first control signals and the second control signals according to the comparison result.

9. A control method of an electric actuator device, comprising:
 providing a plurality of first power switches to respectively provide a first reference voltage to a plurality of voltage receiving ends of a motor respectively according to a plurality of first control signals;
 providing a plurality of second power switches to respectively provide a second reference voltage to the voltage receiving ends of the motor respectively according to a plurality of second control signals; and
 in a braking operation, simultaneously turning on the first power switches during a plurality of first time periods, and simultaneously turning on the second power switches during a plurality of second time periods, wherein the first time periods and the second time periods are alternate and non-overlapped with each other, and an interval time period is present between each adjacent two of the first time periods and the second time periods.

10. The control method according to claim 9, further comprising:
 adjusting a total duration of each of the first time periods, each of the second time periods, and at least one corresponding interval time period that are summed according to rotation speed information of the motor in the braking operation.

11. The control method according to claim 10, wherein, the step of adjusting the total duration according to the rotation speed information of the motor in the braking operation comprises:
 comparing the rotation speed information of the motor with at least one reference value that is predetermined, and adjusting the total duration according to a comparison result.

12. The control method according to claim 11, wherein the total duration is negatively correlated with the rotation speed information of the motor.

* * * * *